No. 772,262.                                              Patented October 11, 1904.

UNITED STATES PATENT OFFICE.

FRANK J. TONE, OF NIAGARA FALLS, NEW YORK.

SELF-BONDED CARBORUNDUM ARTICLE.

SPECIFICATION forming part of Letters Patent No. 772,262, dated October 11, 1904.

Application filed November 10, 1903. Serial No. 180,559. (No model.)

*To all whom it may concern:*

Be it known that I, FRANK J. TONE, of Niagara Falls, Niagara county, New York, have invented a new and useful Self-Bonded Carborundum Article, of which the following is a specification.

In the manufacture of carborundum articles it has been the practice heretofore to bond the carborundum by mixing it with some binding material and subjecting it to heat. The objection to this procedure is that any binding material which can be employed necessarily lessens the fusing-point of the article, and as the highly-refractory nature of the carborundum is one of its important qualities such reduction of the fusing-point is a serious detriment. I have discovered that carborundum can be bonded without this objection and without the use of any binding material by exposing it to a temperature which can be readily obtained in ordinary combustion-furnaces—say a temperature of 2,500° Fahrenheit—if it is presented in such a way that the carborundum is exposed to an oxidizing atmosphere and if the carborundum to be bonded is in whole or in part in the form of fine grains or powder. When the carborundum is thus subjected to heat, the particles thereof become more or less oxidized on the surface and by such oxidation are caused to cement themselves together with great tenacity and without the need of using any foreign binding material and without need of being subjected to such high temperature as is required for recrystallization of the carborundum.

In forming refractory articles—such as bricks, furnace-linings, crucibles, &c.—I take carborundum, all or a portion of which is in the form of fine powder, and mix with it a sufficient amount of water to enable the carborundum to be molded into shape with sufficient coherence to retain its form until fired. The carborundum articles thus molded are dried and burned in a kiln in the manner usual in the manufacture of fire-brick. The flame or furnace-gas of such kiln generally contains sufficient oxygen to produce the desired result without any special care being taken to admit air for the purpose of creating an oxidizing atmosphere. When the articles have thus been exposed in a kiln for about the time and at the temperature usual in the manufacture of fire-brick, it will be found that the partial oxidation of the surface of the particles has bonded the article together, making it coherent and hard and still preserving the valuable chemical and refractory qualities of carborundum.

The article, as above stated, may be composed entirely of powdered carborundum, or it may be composed of equal parts of powdered carborundum and carborundum in the form of coarse grains, or the proportions of fine and powdered carborundum may be varied to suit the particular purpose to which the article is to be applied.

I may also make the article in whole or any part of amorphous carborundum, commonly known in the trade as "white stuff." By "amorphous carborundum" I mean an intermediate amorphous product of the electric furnace between the original charge mixture and the ultimate crystalline carborundum, or the chemical compound resulting from the incomplete conversion of the original charge mixture into the ultimate crystalline form.

In using the carborundum as a coating or facing for bricks, or as a lining for furnace-walls or crucibles which are made of other less refractory materials, I make a mixture of powdered carborundum with sufficient water to form a thin mortar or wash, which I apply to the surface to be covered after the manner of a paint, and after permitting it to dry thereon I subject it to heat, whereupon it becomes a coherent coating, adhering firmly to the surface of the less refractory material to which it is applied. I have obtained good results in making in this manner coatings of one-sixteenth inch in thickness.

I claim—

1. A refractory coherent article composed substantially of superficially-oxidized particles of crystalline or amorphous carborundum, which are bonded by the oxidation and consequent cohesion of said particles; substantially as described.

2. A refractory coherent facing for less refractory articles, composed substantially of superficially-oxidized particles of crystalline or amorphous carborundum, which are bonded by the oxidation and consequent cohesion of said particles; substantially as described.

3. A refractory coherent body composed substantially of superficially-oxidized particles of carborundum, which are bonded by the oxidation and consequent cohesion of said particles; substantially as described.

In testimony whereof I have hereunto set my hand.

FRANK J. TONE.

Witnesses:
ASHMEAD G. RODGERS,
R. S. MARVIN.